(12) United States Patent
Yang et al.

(10) Patent No.: US 7,365,653 B2
(45) Date of Patent: Apr. 29, 2008

(54) DRIVING SUPPORT SYSTEM

(75) Inventors: Changhui Yang, Osaka (JP); Hitoshi Hongo, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 233 days.

(21) Appl. No.: 11/368,434

(22) Filed: Mar. 7, 2006

(65) Prior Publication Data
US 2006/0202984 A1    Sep. 14, 2006

(30) Foreign Application Priority Data

| Mar. 9, 2005 | (JP) | ............................. 2005-065940 |
| May 20, 2005 | (JP) | ............................. 2005-147838 |

(51) Int. Cl.
*G06K 9/00* (2006.01)
*B60Q 1/00* (2006.01)
(52) U.S. Cl. .................... 340/988; 340/435; 382/104
(58) Field of Classification Search ........... 340/995.17, 340/995.14, 995.5, 435–437; 701/300–302; 348/118; 382/104, 106
See application file for complete search history.

(56) References Cited

U.S. PATENT DOCUMENTS

| 5,646,614 | A | | 7/1997 | Abersfelder et al. |
| 6,091,833 | A | * | 7/2000 | Yasui et al. ................. 382/104 |
| 6,411,898 | B2 | * | 6/2002 | Ishida et al. ................ 701/211 |
| 6,756,919 | B2 | * | 6/2004 | Endo et al. ............ 340/995.14 |
| 2002/0080017 | A1 | * | 6/2002 | Kumata et al. ............. 340/436 |
| 2002/0169537 | A1 | * | 11/2002 | Regensburger et al. ....... 701/96 |

(Continued)

FOREIGN PATENT DOCUMENTS

| EP | 1 377 062 A1 | 1/2004 |
| GB | 2 361 376 A | 10/2001 |
| JP | 10-211849 | 8/1998 |
| JP | 2002-087160 | 3/2002 |

OTHER PUBLICATIONS

The European Search Report mailed on May 26, 2006, Sanyo Electric Co., Ltd.

*Primary Examiner*—Benjamin C. Lee
*Assistant Examiner*—Jennifer Mehmood
(74) *Attorney, Agent, or Firm*—NDQ&M Watchstone LLP; S. Peter Konzel

(57) ABSTRACT

A driving support system includes a rotation amount setting means and a bird's eye view image generating means. The rotation amount setting means sets a previously-set inclination angle of the image pickup device to a horizontal plane at a rotation angle during coordinate transformation for the image within a range where a distance from the vehicle is not more than a predetermined threshold in the taken image, while computing and setting the rotation angle during the coordinate transformation based on the previously-set inclination angle of the image pickup device to the horizontal plane and the distance from the vehicle for the image within a range where the distance from the vehicle is more than the predetermined threshold in the taken image. The bird's eye view image generating means generates an extension bird's eye view image by transforming a coordinate of the taken image into a coordinate of a bird's eye view using the rotation angle set by the rotation amount setting means for the image corresponding to the coordinate.

9 Claims, 11 Drawing Sheets

U.S. PATENT DOCUMENTS

2002/0196340 A1 12/2002 Kato et al.
2003/0165255 A1* 9/2003 Yanagawa et al. .......... 382/104
2004/0260469 A1 12/2004 Mizusawa
2006/0029255 A1* 2/2006 Ozaki ........................ 382/104
2007/0009137 A1* 1/2007 Miyoshi et al. ............. 382/104

* cited by examiner

DRIVING SUPPORT SYSTEM

BACKGROUND OF THE INVENTION

1. Field of the Invention

The present invention relates to a driving support system.

2. Description of the Related Art

When a vehicle is driven in reverse, it is difficult for the vehicle driver to confirm a backside because a dead angle is generated. Therefore, there has been already developed a system which is equipped with an in-vehicle camera for monitoring the vehicle backside, where the dead angle is easy to be generated for the driver, to display an image taken by the camera on a screen of a car navigation system or the like.

However, when a wide angle lens is used in order to display a wide range, a lens strain is generated in the screen image. When compared with a normal lens, an object becomes smaller as the object is separated away from the camera, and it is difficult for the driver to recognize a distance and a space of the vehicle backside from the taken image.

Therefore, there is developed a research on which the screen image of the camera is not simply displayed, but the user-friendly screen image is displayed by utilizing an image processing technology. For example, Japanese Patent Laid-Open Nos. H10-211849 and 2002-87160 disclose a system in which coordinate transformation is performed to the taken image to generate and display a bird's eye view image viewed from above the ground. The driver easily recognizes the distance and the space of the vehicle backside by displaying the bird's eye view image viewed from above the ground.

In the system in which the bird's eye view image is generated and displayed, the easily viewable image viewed from above the ground can be shown to the driver. However, there is a problem that height information of the object is lost and becomes less easy to perceive the object, because the object basically having the height is projected in a plane. Because the coordinate transformation is performed based on the ground, in the object having the height different from that of the ground, a shape of the object cannot correctly be maintained due to a difference in height between the object and the ground.

Particularly, as the object is distant from the vehicle, the small difference in height between the object and the ground emerges remarkably on the bird's eye view image, and the object is displayed as if the object is largely tall. That is, in a region distant from the vehicle, image quality of the bird's eye view image is degraded and the shape of the object is not correctly displayed, which worsens visibility.

Therefore, in the generated bird's eye view image, only the region near the vehicle is displayed while the region distant from the vehicle is eliminated, or the bird's eye view image and the original image are respectively displayed. There is a problem that a view angle is narrowed in the former, and there is a problem that a larger monitor is required in the latter.

A device in which the screen images obtained from multiple cameras are transformed into an all-round bird's eye view image by geometrical transformation to display it on the monitor has been developed as a driving support system for parking. In the device, because the screen image all around the vehicle viewed from above can be shown to the driver, there is an advantage that all the peripheries of the vehicle can be displayed with no dead angle. However, in the bird's eye view image, because an obstacle having the height is also projected to the ground, the height information on the obstacle is lost and the shape of the obstacle is deformed as the obstacle is distant from the vehicle. Further, because a size of a display screen is restricted, the far side cannot sufficiently be displayed in the bird's eye view image.

SUMMARY OF THE INVENTION

The object of the invention is to provide a driving support system which obtains the high visibility even in a region distant from a vehicle.

A first mode of a driving support system according to the invention which generates a bird's eye view image to display the bird's eye view image on a display device based on an image taken by an image pickup device mounted on a vehicle, the image pickup device taking the image around the vehicle, the driving support system includes a rotation amount setting means (a rotation angle setting means) for setting a previously-set inclination angle of the image pickup device with respect to a horizontal plane at a rotation angle during coordinate transformation for the image within a range in which a distance from the vehicle is not more than a predetermined threshold in the taken image, the rotation amount setting means which computes and sets the rotation angle during the coordinate transformation based on the previously-set inclination angle of the image pickup device with respect to the horizontal plane and the distance from the vehicle for the image within a range in which the distance from the vehicle is more than the predetermined threshold in the taken image; a bird's eye view image generating means for generating an extension bird's eye view image by transforming a coordinate of the taken image into a bird's eye view coordinate using the rotation angle to the image corresponding to the coordinate, the rotation angle being set by the rotation amount setting means; and a means for displaying the extension bird's eye view image on the display device, the extension bird's eye view image being obtained by the bird's eye view image generating means.

For example, the rotation amount setting means which computes the rotation angle during the coordinate transformation such that the rotation angle during the coordinate transformation is decreased as the distance from the vehicle is increased for the image within the range in which the distance from the vehicle is more than the predetermined threshold in the taken image is used as the rotation amount setting means.

For example, the rotation amount setting means including a first means for computing the distance from the vehicle to each portion of the taken image using a transformation for transforming a coordinate of the taken image into a ground coordinate; a second means for determining and setting the rotation angle during the coordinate transformation in each portion of the taken image based on the previously-set inclination angle of the image pickup device with respect to the horizontal plane, the distance computed by the first means, and the previously set predetermined threshold is used as the rotation amount setting means.

A second mode of the driving support system according to the invention which generates a bird's eye view image to display the bird's eye view image on a display device based on an image taken by an image pickup device mounted on a vehicle, the image pickup device taking the image around the vehicle, the driving support system includes a coordinate transformation table which transforms a coordinate of the taken image into a coordinate of an extension bird's eye view image defined in the above first mode of the driving support system; a bird's eye view image generating means for generating an extension bird's eye view image by transforming the coordinate of the taken image into the coordinate of the extension bird's eye view image using the coordinate transformation table; and a means for displaying the extension bird's eye view image on the display device, the extension bird's eye view image being obtained by the bird's eye view image generating means.

A third mode of the driving support system according to the invention which generates a bird's eye view image to display the bird's eye view image on a display device based on an image taken by multiple image pickup devices, the image pickup devices being mounted on at least front and rear portions of a vehicle, the image pickup devices taking the image around the vehicle, the driving support system includes an all-round bird's eye view image generating means for generating plural kinds of all-round bird's eye view images from the images taken by the image pickup devices according to a moving direction of the vehicle; and a means for displaying an extension bird's eye view image on the display device, an extension bird's eye view image being obtained by the all-round bird's eye view image generating means, wherein all-round bird's eye view image is generated by synthesizing the bird's eye view images obtained from the images taken by the image pickup devices; and the all-round bird's eye view image generating means generates an extension bird's eye view image defined in the above first mode of the driving support system from the taken image in a direction corresponding to the moving direction of the vehicle, the all-round bird's eye view image generating means generates a normal bird's eye view image from the taken image in another direction, and the all-round bird's eye view image generating means generates the all-round bird's eye view image in which the extension bird's eye view image and the normal bird's eye view image are synthesized.

A fourth mode of the driving support system according to the invention which generates a bird's eye view image to display the bird's eye view image on a display device based on an image taken by multiple image pickup devices, the image pickup devices being mounted on at least front, rear, right and left portions of a vehicle, the image pickup devices taking the image around the vehicle, the driving support system includes an all-round bird's eye view image generating means for generating each kind of an all-round bird's eye view image according to a case where the vehicle is driven forward or a case where the vehicle is driven in reverse; and a means for displaying an extension bird's eye view image on the display device, the extension bird's eye view image being obtained by the all-round bird's eye view image generating means, wherein all-round bird's eye view image is generated by synthesizing the bird's eye view images obtained from the images taken by the image pickup devices; the all-round bird's eye view image generating means generates an extension bird's eye view image defined in the above first mode of the driving support system from the image taken by the front-side image pickup device, the all-round bird's eye view image generating means generates normal bird's eye view images from the images taken by the rear-side and both-side image pickup devices, and the all-round bird's eye view image generating means generates a first all-round bird's eye view image in which the extension bird's eye view image and the normal bird's eye view images are synthesized, when the vehicle is driven forward; and the all-round bird's eye view image generating means generates the extension bird's eye view image defined in the above first mode of the driving support system from the image taken by the rear-side image pickup device, the all-round bird's eye view image generating means generates the normal bird's eye view images from the images taken by the front-side and both-side image pickup devices, and the all-round bird's eye view image generating means generates a second all-round bird's eye view image in which the extension bird's eye view image and the normal bird's eye view images are synthesized, when the vehicle is driven in reverse.

For the all-round bird's eye view image generating means, for example, all-round bird's eye view image generating means includes a first coordinate transformation table which transforms a coordinate of the image taken by each image pickup device into a coordinate of the first all-round bird's eye view image; a second coordinate transformation table which transforms the coordinate of the image taken by each image pickup device into a coordinate of the second all-round bird's eye view image; a first all-round bird's eye view image generating means for generating the first all-round bird's eye view image by transforming the coordinate of the image taken by each image pickup device into the coordinate of the first all-round bird's eye view image using the first coordinate transformation table, when vehicle is driven forward; and a second all-round bird's eye view image generating means for generating the second all-round bird's eye view image by transforming the coordinate of the image taken by each image pickup device into the coordinate of the second all-round bird's eye view image using the second coordinate transformation table, when vehicle is driven in reverse is used as the all-round bird's eye view image generating means.

A fifth mode of the driving support system according to the invention which generates a bird's eye view image to display the bird's eye view image on a display device based on an image taken by multiple image pickup devices, the image pickup devices being mounted on at least front, rear, right, and left portions of a vehicle, the image pickup devices taking the image around the vehicle, the driving support system includes an all-round bird's eye view image generating means for generating each kind of an all-round bird's eye view image according to, a case where the vehicle is stopped, a case where the vehicle is driven forward, or a case where the vehicle is driven in reverse; and a means for displaying an extension bird's eye view image on the display device, an extension bird's eye view image being obtained by the all-round bird's eye view image generating means, wherein an all-round bird's eye view image is generated by synthesizing the bird's eye view images obtained from the images taken by the image pickup devices; the all-round bird's eye view image generating means generates extension bird's eye view images defined in the above first mode of the driving support system from the images taken by the front-side and rear-side image pickup devices, the all-round bird's eye view image generating means generates normal bird's eye view images from the images taken by the both-side image pickup devices, and the all-round bird's eye view image generating means generates a first all-round bird's eye view image in which the extension bird's eye view images and the normal bird's eye view images are synthesized, when the vehicle is stopped; the all-round bird's eye view image generating means generates the extension bird's eye view image defined in the above first mode of the driving support system from the image taken by the front-side image pickup device, the all-round bird's eye view image generating means generates the normal bird's eye view images from the images taken by the rear-side and both-side image pickup devices, and the all-round bird's eye view image generating means generates a second all-round bird's eye view image in which the extension bird's eye view image and the normal bird's eye view images are synthesized, when the vehicle is driven forward; and the all-round bird's eye view image generating means generates the extension bird's eye view image defined in the above first mode of the driving support system from the image taken by the rear-side image pickup device, the all-round bird's eye view image generating means generates the normal bird's eye view images from the images taken by the front-side and both-side image pickup devices, and the all-round bird's eye view image generating means generates a third all-round bird's eye view image in which the extension bird's eye view image and the normal bird's eye view images are synthesized, when the vehicle is driven in reverse.

For an all-round bird's eye view image generating means, for example, all-round bird's eye view image generating means includes a first coordinate transformation table which transforms a coordinate of the image taken by each image pickup device into a coordinate of the first all-round bird's eye view image; a second coordinate transformation table which transforms the coordinate of the image taken by each image pickup device into a coordinate of the second all-round bird's eye view image; a third coordinate transformation table which transforms the coordinate of the image taken by each image pickup device into a coordinate of the third all-round bird's eye view image; a first all-round bird's eye view image generating means for generating the first all-round bird's eye view image by transforming the coordinate of the image taken by each image pickup device into the coordinate of the first all-round bird's eye view image using the first coordinate transformation table, when vehicle is stopped; a second all-round bird's eye view image generating means for generating the second all-round bird's eye view image by transforming the coordinate of the image taken by each image pickup device into the coordinate of the second all-round bird's eye view image using the second coordinate transformation table, when vehicle is driven forward; and a third all-round bird's eye view image generating means for generating the third all-round bird's eye view image by transforming the coordinate of the image taken by each image pickup device into the coordinate of the third all-round bird's eye view image using the third coordinate transformation table, when vehicle is driven in reverse.

DESCRIPTION OF THE PREFERRED EMBODIMENTS

Preferred embodiments of the invention will be described below with reference to the accompanying drawings.

First Embodiment

Figure 1:
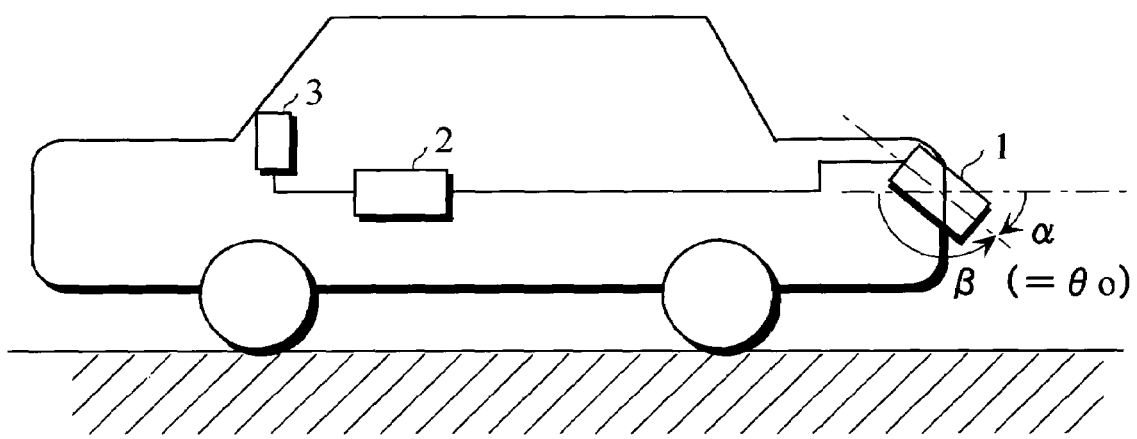
FIG. 1 shows a configuration of a driving support system provided in an automobile.

FIG. 1 shows a configuration of a driving support system provided in an automobile. The invention has the feature in a technique of generating the bird's eye view image, and the bird's eye view image generated by the technique of the invention differs from the bird's eye view image generated by the conventional technique. Hereinafter the bird's eye view image generated by the technique of the invention is referred to as extension bird's eye view image.

The driving support system includes a camera (image pickup device) 1, an image processing unit 2, and a monitor (display device) 3. The camera 1 is arranged rearward and obliquely downward in a rear portion of a vehicle. The image processing unit 2 provided in the vehicle generates the extension bird's eye view image from the image taken by the camera 1. The monitor 3 arranged in a dashboard inside the vehicle displays the extension bird's eye view image generated by the image processing unit 2.

For example, a CCD camera is used as the camera 1, a microcomputer is used as the image processing unit 2, and a navigation system monitor is used as the monitor 3.

As shown in FIG. 1, an angle formed by a horizontal plane and an optical axis of the camera 1 includes an angle expressed by α and an angle expressed by β. The angle α is generally called a look-down angle or a depression angle α. In this specification, the angle β shall mean an inclination angle θo of the camera 1 to the horizontal plane.

Figure 2:
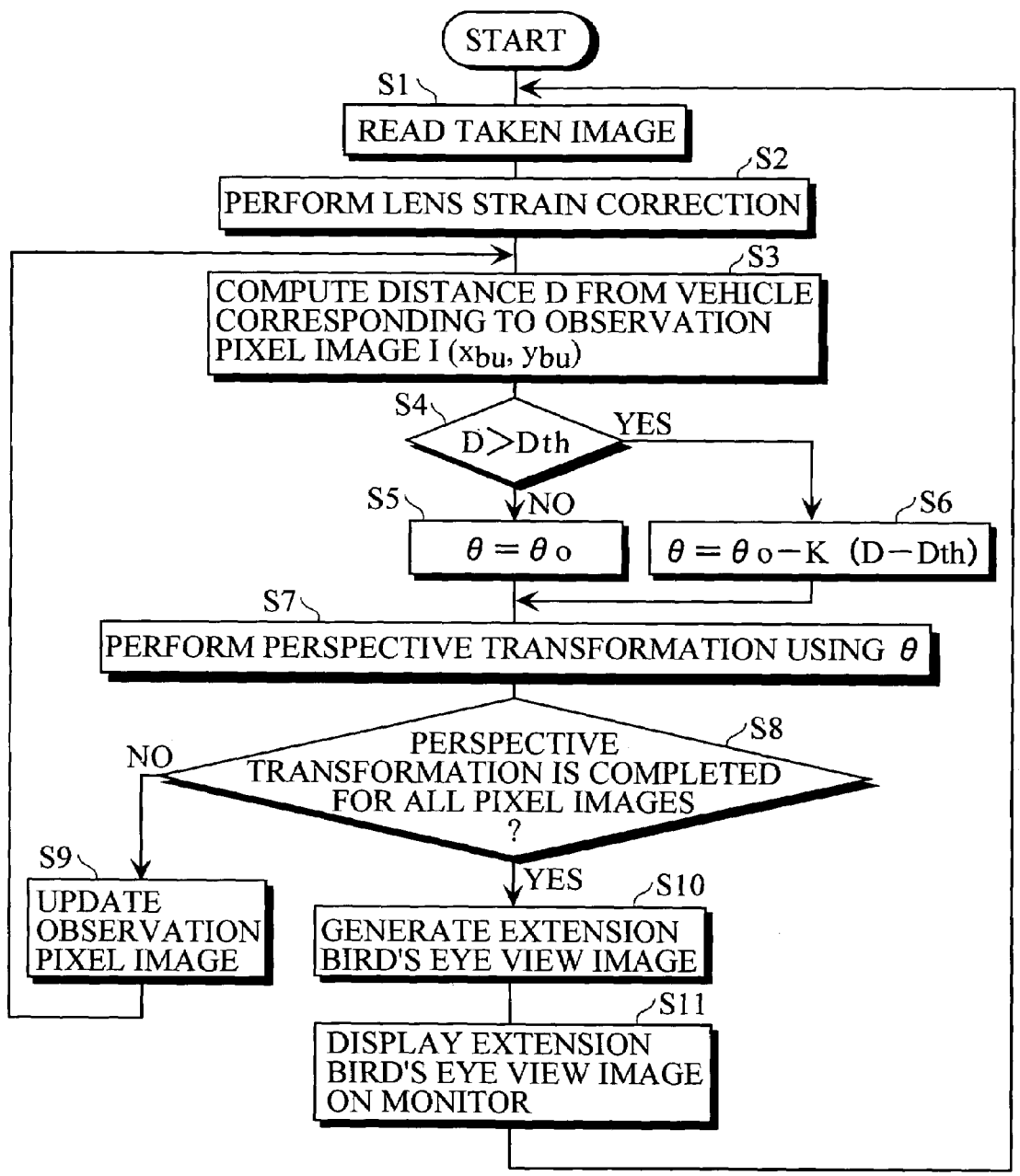
FIG. 2 is a flowchart showing a procedure performed by an image processing unit 2.

FIG. 2 is a flowchart showing a procedure performed by an image processing unit 2.

It is assumed that parameters such as a height h of the camera 1 from the ground, the inclination angle θo of the camera 1 to the horizontal plane, a lens focal distance f of the camera 1, and a lens strain correction value of the camera 1 are previously set.

The image taken by the camera 1 is read (Step S1). Then, the lens strain correction is performed (Step S2). Hereinafter the image obtained by the lens strain correction is referred to as input image I, and the image of each pixel of the input image I is referred to as input pixel image I ($x_{bu}$, $y_{bu}$).

One input pixel image I ($x_{bu}$, $y_{bu}$) is set at an observation pixel image, and a distance D from the vehicle corresponding to the observation pixel image I ($x_{bu}$, $y_{bu}$) is computed (Step S3). The detailed process in Step S3 will be described later.

Then, it is determined whether the distance D corresponding to the observation pixel image I ($x_{bu}$, $y_{bu}$) is more than a predetermined threshold Dth or not (Step S4). When the distance D is not more than the threshold Dth, an amount of rotation (rotation angle) θ used in a perspective transformation (coordinate transformation) is set at the attachment angle θo of the camera 1 (Step S5), and the flow goes to Step S7.

In Step S4, when the distance D is more than the threshold Dth, the amount of rotation θ used in the perspective transformation (coordinate transformation) is computed by the following formula (1) (Step S6), and the flow goes to Step S7.

$$\theta = \theta o - k(D - Dth) \tag{1}$$

where k is a predetermined coefficient. The coefficient k is set such that the minimum value of the amount of rotation θ is not lower than 90 degrees. As can be seen from the formula (1), the amount of rotation θ is decreased as the distance D is increased more than the threshold Dth.

In Step S7, a coordinate of the observation pixel image I ($x_{bu}$, $y_{bu}$) is transformed into a coordinate of a two-dimensional ground coordinate system XwZw by performing the perspective transformation while the amount of rotation is set at θ. The detailed process in Step S7 will be described later.

It is determined whether the perspective transformation in Step S7 is completed for all the input pixel images I ($x_{bu}$, $y_{bu}$) or not (Step S8). When the perspective transformation in Step S7 is not completed for all the input pixel images I ($x_{bu}$, $y_{bu}$), the observation pixel image is updated to the next input pixel image I ($x_{bu}$, $y_{bu}$) (Step S9), and the flow returns to Step S3.

In Step S8, when the perspective transformation in Step S7 is completed for all the input pixel images I ($x_{bu}$, $y_{bu}$), the extension bird's eye view image is generated from the post-perspective transformation image corresponding to the input image I (Step S10). The detailed process in Step S10 will be described later. The generated extension bird's eye view image is displayed on the monitor 3. Then, the flow returns to Step S1.

The detailed processes in Steps S3, S7, and S10 will be described.

Figure 3:
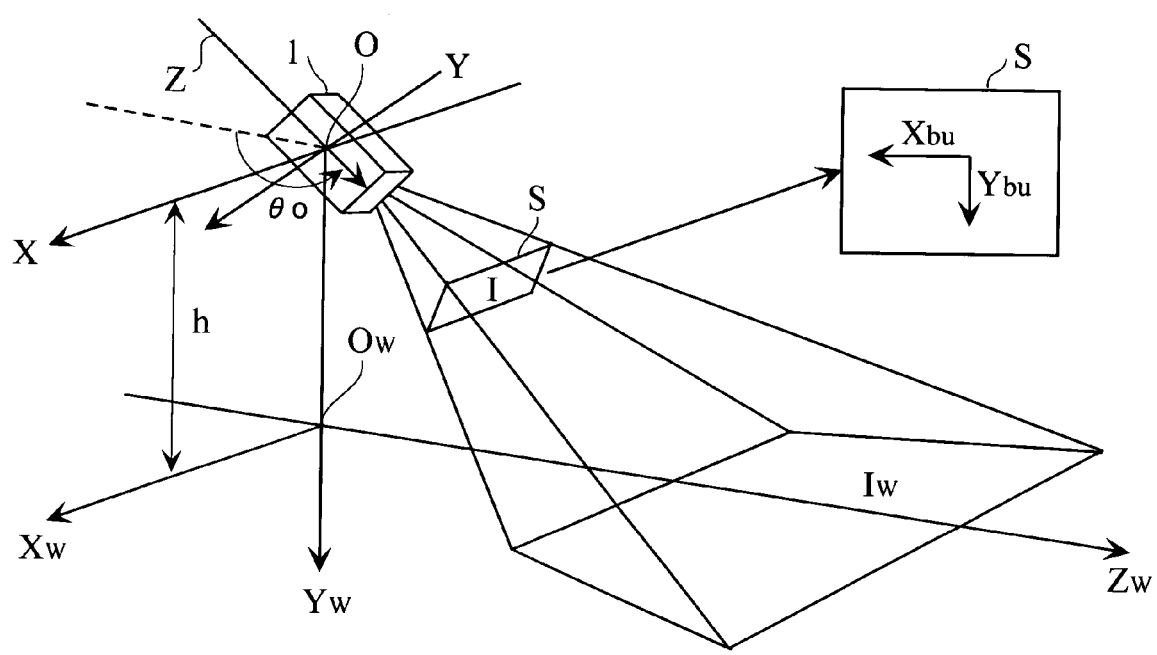
FIG. 3 is a schematic view showing a relationship among a camera coordinate system XYZ, a coordinate system $X_{bu}Y_{bu}$ of an imaging surface S of a camera 1, and a world coordinate system $X_w Y_w Z_w$ including a two-dimensional ground coordinate system $X_w Z_w$.

FIG. 3 shows a relationship among a camera coordinate system XYZ, a coordinate system $X_{bu}Y_{bu}$ of an imaging surface S of the camera 1, and a world coordinate system $X_wY_wZ_w$ including the two-dimensional ground coordinate system $X_wZ_w$.

In the camera coordinate system XYZ, an optical center of the camera is set at an origin O, a Z-axis is set at an optical axis direction, an X-axis is set at a direction which is orthogonal to the Z-axis and parallel to the ground, and a Y-axis is set at a direction orthogonal to the Z-axis and the Y-axis. In the coordinate system $X_{bu}Y_{bu}$ of the imaging surface S, the center of the imaging surface S is set at the origin, an $X_{bu}$-axis is set at a crosswise direction of the imaging surface S, and a $Y_{bu}$-axis is set at a longitudinal direction of the imaging surface S.

In the world coordinate system $X_wY_wZ_w$, an intersection point of the ground and a perpendicular passing through the origin O of the camera coordinate system XYZ is set at an origin $O_w$, a $Y_w$-axis is set at the direction perpendicular to the ground, an $X_w$-axis is set at the direction parallel to the X-axis of the camera coordinate system XYZ, and a $Z_w$-axis is set at the direction orthogonal to the $X_w$-axis and the $Y_w$-axis.

A translation amount between the world coordinate system $X_wY_wZ_w$ and the camera coordinate system XYZ is (0, h, 0), and a rotation amount about the X-axis is θ (=θo).

Therefore, the transformation between a coordinate (x, y, z) of the camera coordinate system XYZ and a coordinate ($x_w$, $y_w$, $z_w$) of the world coordinate system $X_wY_wZ_w$ is expressed by the following formula (2).

$$\begin{bmatrix} x \\ y \\ z \end{bmatrix} = \begin{bmatrix} 1 & 0 & 0 \\ 0 & \cos\theta & -\sin\theta \\ 0 & \sin\theta & \cos\theta \end{bmatrix} \left\{ \begin{bmatrix} x_w \\ y_w \\ z_w \end{bmatrix} + \begin{bmatrix} 0 \\ h \\ 0 \end{bmatrix} \right\} \tag{2}$$

The transformation between the coordinate ($x_{bu}$, $y_{bu}$) of the coordinate system $X_{bu}Y_{bu}$ of the imaging surface S and the coordinate (x, y, z) of the camera coordinate system XYZ is expressed by the following formula (3).

$$\begin{bmatrix} x_{bu} \\ y_{bu} \end{bmatrix} = \begin{bmatrix} f\dfrac{x}{z} \\ f\dfrac{y}{z} \end{bmatrix} \tag{3}$$

where f is a focal distance of the camera 1.

A transformation (4) between the coordinate ($x_{bu}$, $y_{bu}$) of the coordinate $X_{bu}Y_{bu}$ of the imaging surface S and the coordinate ($x_w$, $z_w$) of the two-dimensional ground coordinate system $X_wZ_w$, is obtained from the formulas (2) and (3).

$$\begin{bmatrix} x_{bu} \\ y_{bu} \end{bmatrix} = \begin{bmatrix} \dfrac{f x_w}{h\sin\theta + z_w\cos\theta} \\ \dfrac{(h\cos\theta - z_w\sin\theta)f}{h\sin\theta + z_w\cos\theta} \end{bmatrix} \tag{4}$$

Projection from the two-dimensional ground coordinate system $X_wZ_w$ to a bird's eye view coordinate system $X_{au}Y_{au}$ of a virtual camera is performed by parallel projection. Assuming that f is a focal distance of the camera 1 and H is a height position of the virtual camera, the transformation between the coordinate ($x_w$, $z_w$) of the two-dimensional ground coordinate system $X_wZ_w$ and a coordinate ($x_{au}$, $y_{au}$) of the bird's eye view coordinate system $X_{au}Y_{au}$ is expressed by the following formula (5). The height position H of the virtual camera is previously set.

$$\begin{bmatrix} x_{au} \\ y_{au} \end{bmatrix} = \dfrac{f}{H}\begin{bmatrix} x_w \\ z_w \end{bmatrix} \tag{5}$$

In Step S3, the coordinate ($x_w$, $z_w$) of the two-dimensional ground coordinate system $X_wZ_w$ corresponding to the coordinate ($x_{bu}$, $y_{bu}$) of the observation pixel image I ($x_{bu}$, $y_{bu}$) is computed using the transformation (4) between the coordinate ($x_{bu}$, $y_{bu}$) of the coordinate system $X_{bu}Y_{bu}$ of the imaging surface S and the coordinate ($x_w$, $z_w$) of the two-dimensional ground coordinate system $X_wZ_w$, and the obtained coordinate $z_w$ is set at the distance D corresponding to the observation pixel image I ($x_{bu}$, $y_{bu}$). In this case, θ in the transformation (4) is always θo.

In Step S7, the coordinate ($x_{bu}$, $y_{bu}$) of the observation pixel image I ($x_{bu}$, $y_{bu}$) is transformed into the coordinate ($x_w$, $z_w$) of the two-dimensional ground coordinate system $X_w Z_w$ using θ given in Step S5 or Step 6 and the transformation (4). The process is performed to all the input pixel images I ($x_{bu}$, $y_{bu}$), which transforms the input image I into the image $I_w$ of the two-dimensional ground coordinate system $X_w Z_w$.

In Step S10, the coordinate ($x_w$, $z_w$) of the image $I_w$ of the two-dimensional ground coordinate system $X_w Z_w$ is transformed into the coordinate ($x_{au}$, $y_{au}$) of the bird's eye view coordinate system $X_{au} Y_{au}$ using a transformation (5) between the coordinate ($x_w$, $z_w$) of the two-dimensional ground coordinate system $X_w Z_w$ and the coordinate ($x_{au}$, $y_{au}$) of the bird's eye view coordinate system $X_{au} Y_{au}$. Therefore, the extension bird's eye view image is generated.

In the first embodiment, for the image within the range in which the distance D from the vehicle is not more than the threshold Dth in the input image I, similarly to the normal bird's eye view image generating technique, the bird's eye view image is generated by performing the coordinate transformation with θo of the rotation amount θ. For the image within the range in which the distance D from the vehicle is more than the threshold Dth in the input image I, θ is set so as to be decreased as the distance D is increased more than the threshold Dth, the coordinate transformation is performed with the set θ to generate the bird's eye view image different from the normal bird's eye view image. Hereinafter the latter bird's eye view image different from the normal bird's eye view image is referred to as pseudo-bird's eye view image. The extension bird's eye view image is formed by synthesizing the normal bird's eye view image generated for the image within the range in which the distance D from the vehicle is not more than the threshold Dth and the pseudo-bird's eye view image generated for the image within the range in which the distance D from the vehicle is more than the threshold Dth.

Second Embodiment

In the first embodiment, the coordinate of the input image I is transformed into the coordinate of the two-dimensional ground coordinate system $X_w Z_w$, and then the coordinate of the two-dimensional ground coordinate system $X_w Z_w$ is transformed into the coordinate of the bird's eye view coordinate system $X_{au} Y_{au}$. However, the coordinate of the input image I is directly transformed into the coordinate of the bird's eye view coordinate system $X_{au} Y_{au}$.

First a formula for transforming the coordinate ($x_{bu}$, $y_{bu}$) of the input image I into the coordinate ($x_{au}$, $y_{au}$) of the bird's eye view coordinate system $X_{au} Y_{au}$ will be described.

The following formula (6) is obtained from the formula (5).

$$\begin{bmatrix} x_w \\ z_w \end{bmatrix} = \frac{H}{f} \begin{bmatrix} x_{au} \\ y_{au} \end{bmatrix} \quad (6)$$

When the obtained formula (6) is substituted for the formula (4), the following formula (7) is obtained.

$$\begin{bmatrix} x_{bu} \\ y_{bu} \end{bmatrix} = \begin{bmatrix} \dfrac{fHx_{au}}{fh\sin\theta + Hy_{au}\cos\theta} \\ \dfrac{f(fh\cos\theta - Hy_{au}\sin\theta)}{fh\sin\theta + Hy_{au}\cos\theta} \end{bmatrix} \quad (7)$$

A formula (8) for transforming the coordinate ($x_{bu}$, $y_{bu}$) of the input image I into the coordinate ($x_{au}$, $y_{au}$) of the bird's eye view coordinate system $X_{au} Y_{au}$ is obtained from the formula (7).

$$\begin{bmatrix} x_{au} \\ y_{au} \end{bmatrix} = \begin{bmatrix} \dfrac{x_{bu}(fh\sin\theta + Hy_{au}\cos\theta)}{fH} \\ \dfrac{fh(f\cos\theta - y_{bu}\sin\theta)}{H(f\sin\theta + y_{bu}\cos\theta)} \end{bmatrix} \quad (8)$$

Figure 4:
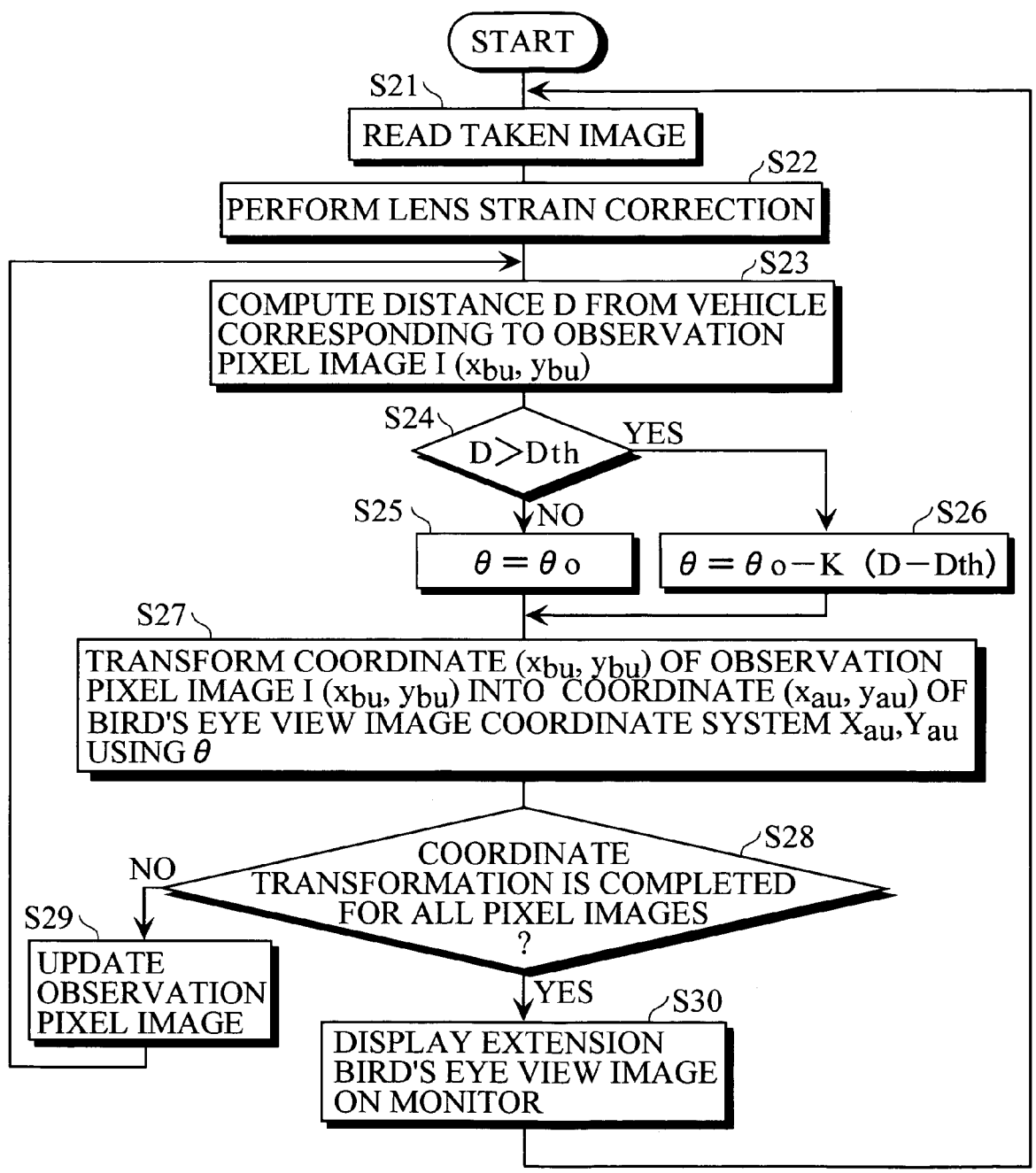
FIG. 4 is a flowchart showing a procedure performed by the image processing unit 2.

FIG. 4 is a flowchart showing a procedure performed by the image processing unit 2.

It is assumed that parameters such as the height h of the camera 1 from the ground, the inclination angle θo of the camera 1 to the horizontal plane, the lens focal distance f of the camera 1, and the lens strain correction value of the camera 1 are previously set.

The image taken by the camera 1 is read (Step S21). Then, the lens strain correction is performed (Step S22). Hereinafter the image obtained by the lens strain correction is referred to as input image I, and the image of each pixel of the input image I is referred to as input pixel image I ($x_{bu}$, $y_{bu}$).

One input pixel image I ($x_{bu}$, $y_{bu}$) is set at the observation pixel image, and a distance D from the vehicle corresponding to the observation pixel image I ($x_{bu}$, $y_{bu}$) is computed (Step S23). The process in Step S23 is similar to that of Step S3 shown in FIG. 2.

Then, it is determined whether the distance D corresponding to the observation pixel image I ($x_{bu}$, $y_{bu}$) is more than the predetermined threshold Dth or not (Step S24). When the distance D is not more than the threshold Dth, the amount of rotation θ is set at the attachment angle θo of the camera 1 (Step S25), and the flow goes to Step S27.

In Step S24, when the distance D is more than the threshold Dth, the amount of rotation θ is computed by the formula (1) (Step S26), and the flow goes to Step S27.

In Step S27, the coordinate ($x_{bu}$, $y_{bu}$) of the observation pixel image I ($x_{bu}$, $y_{bu}$) is transformed into the coordinate ($x_{au}$, $y_{au}$) of the bird's eye view coordinate system $X_{au} Y_{au}$ using θ given in Step S25 or Step 26 and the transformation (8).

It is determined whether the coordinate transformation in Step S27 is completed for all the input pixel images I ($x_{bu}$, $y_{bu}$) or not (Step S28). When the coordinate transformation in Step S27 is not completed for all the input pixel images I ($x_{bu}$, $y_{bu}$), the observation pixel image is updated to the next input pixel image I ($x_{bu}$, $y_{bu}$) (Step S29), and the flow returns to Step S23.

When the coordinate transformation in Step S27 is completed for all the input pixel images I ($x_{bu}$, $y_{bu}$) (YES in Step S28), the coordinates ($x_{bu}$, $y_{bu}$) of all the input pixel images I ($x_{bu}$, $y_{bu}$) are transformed into the coordinate ($x_{au}$, $y_{au}$) of the bird's eye view coordinate system $X_{au} Y_{au}$, the bird's eye view image (extension bird's eye view image) is generated and displayed on the monitor 3 (Step S30). Then, the flow returns to Step S21.

Third Embodiment

In a third embodiment, the coordinate on the extension bird's eye view image corresponding to the coordinate of each image of the input image I (image obtained by lens strain correction) is previously determined based on technique of the first embodiment or the second embodiment, and the coordinate on the extension bird's eye view image is stored as an image transformation table in storage means. Then, the input image I is transformed into the extension bird's eye view image using the image transformation table.

Alternatively, the coordinate transformation table for performing the strain correction to transform the image (original image) taken by the camera 1 into the extension bird's eye view image is prepared in consideration of the lens strain correction, and the extension bird's eye view image may be generated from the image taken by the camera 1 using the coordinate transformation table.

Figure 5A:
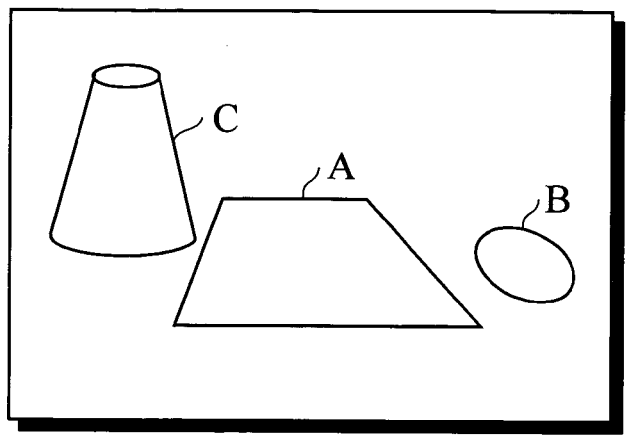
FIGS. 5A to 5C are schematic views showing an input image, a bird's eye view image generated by a conventional technique, and a bird's eye view image generated by a technique of the invention respectively.
Figure 5B:
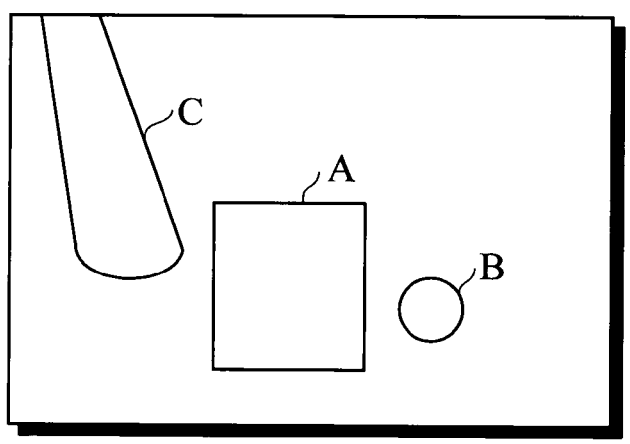
Figure 5C:
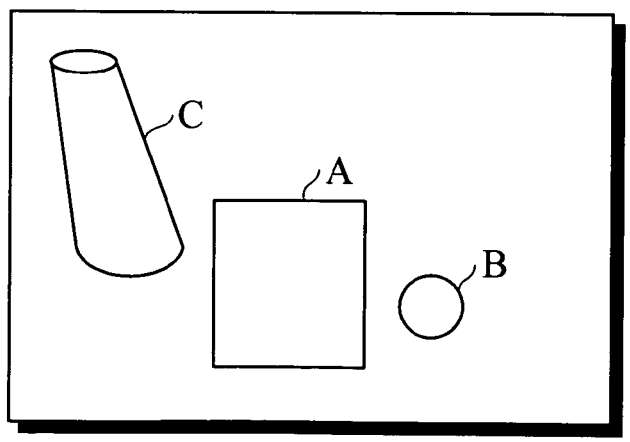

A difference between the normal bird's eye view image and the extension bird's eye view image will be described below. FIG. 5A shows an example of the input image I. FIG. 5B shows the bird's eye view image which is obtained by keeping the rotation angle θ constant for all the regions of the input image. That is, FIG. 5B shows the normal bird's eye view image generated by the conventional technique. FIG. 5C shows the extension bird's eye view image which is obtained by setting the rotation angle θ according to the distance D from the vehicle like the above embodiments. That is, FIG. 5C shows the bird's eye view image generated by the technique of the invention.

In FIG. 5A, the sign A designates a white frame drawn on the ground, the sign B designates a planar object placed on the ground near the vehicle, and the sign C designates a truncated conical object placed away from the vehicle.

As can be seen from FIG. 5B, in the normal bird's eye view image generated by the conventional technique, the object C placed away from the vehicle is hardly visible because the object C is stretched in the longitudinal direction. On the other hand, in the extension bird's eye view image shown in FIG. 5C, a degree of stretch of the object C is suppressed to a lower level, and the visibility is improved. That is, in the bird's eye view image generated by the technique of the invention, the image in which the distance and the space are easily understood is obtained for the region near the vehicle, and the image in which the deformation of the object is suppressed is obtained for the region distant from the vehicle. Therefore the visibility is improved.

Fourth Embodiment

Figure 6:
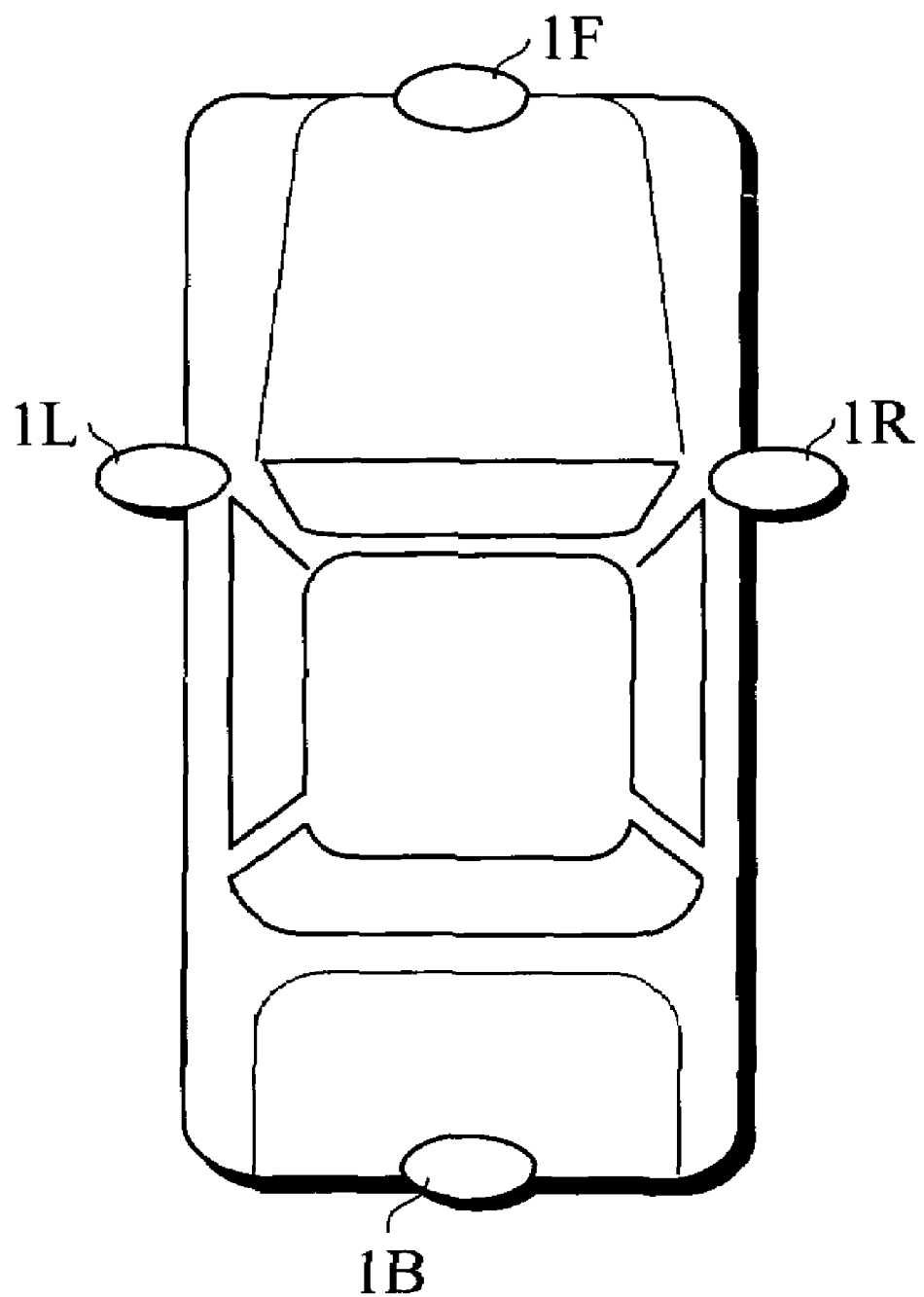
FIG. 6 is a plan view showing an arrangement example of cameras 1F, 1B, 1L, and 1R.
Figure 7:
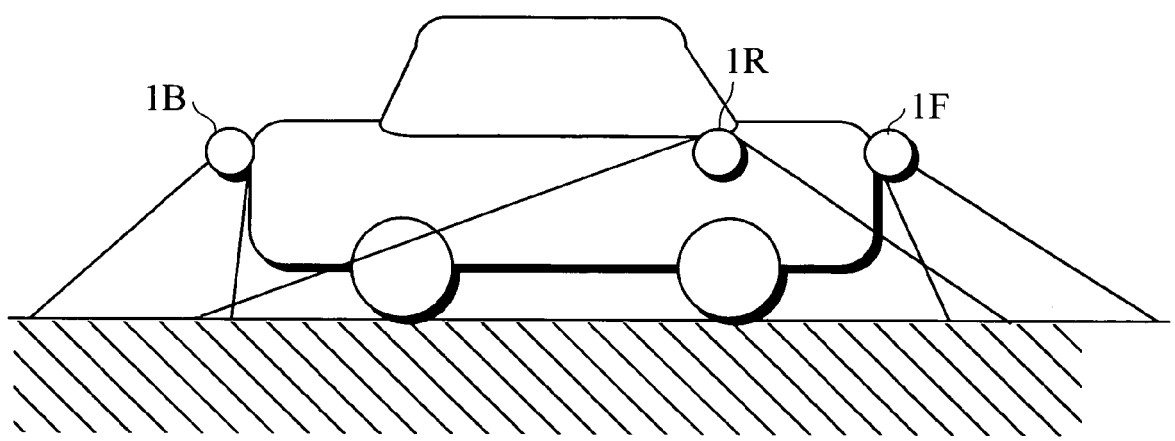
FIG. 7 is a side view of FIG. 6.

In a fourth embodiment, as shown in FIGS. 6 and 7, cameras (image pickup devices) 1F, 1B, 1L, and 1R are provided in a front portion, a rear portion, a left-side portion, and right-side portion of the vehicle respectively. The camera 1F is arranged obliquely downward in the front portion, the camera 1B is arranged obliquely downward in the rear portion, the camera 1L is arranged obliquely downward in the left direction, and the camera 1F is arranged obliquely downward in the right direction.

The fourth embodiment is characterized in that the different all-round bird's eye view images are generated from the images taken by the four cameras 1F, 1B, 1L, and 1R according to the case where the vehicle is stopped, the case where the vehicle is driven forward, and the case where the vehicle is driven in reverse.

Therefore, a basic thought of the all-round bird's eye view image generating method will be described.

Figure 8:
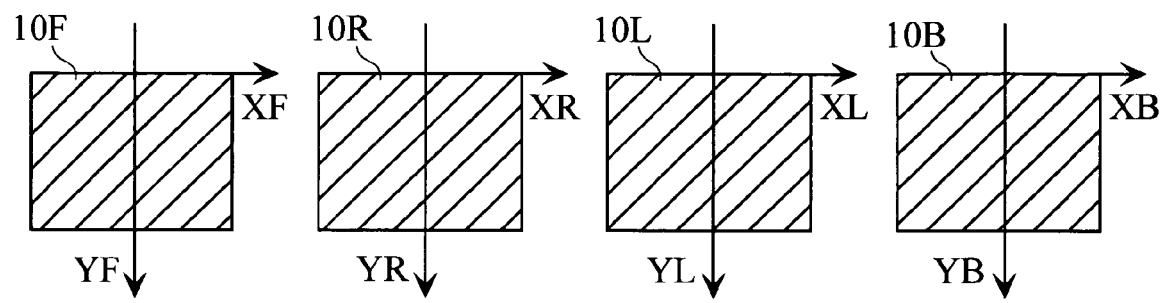
FIG. 8 is a schematic view showing bird's eye view images 10F, 10B, 10L, and 10R obtained from images taken by the cameras 1F, 1B, 1L, and 1R respectively.
Figure 9:
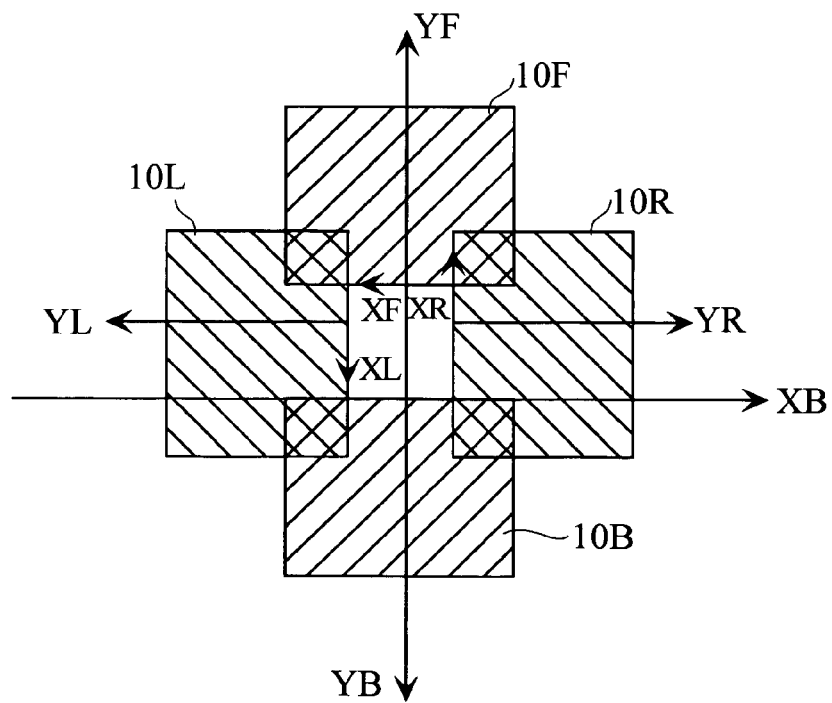
FIG. 9 is a schematic view showing that the four bird's eye view images 10F, 10B, 10L, and 10R are synthesized by transforming the three bird's eye view images 10F, 10L, and 10R into a bird's eye view image coordinate of the rear-side camera 1B of FIG. 8 by rotation and translation based on the bird's eye view image 10B for the rear-side camera 1B.

As shown in FIG. 8, bird's eye view images 10F, 10B, 10L, and 10R are generated from the images taken by the cameras 1F, 1B, 1L, and 1R respectively. Then, as shown in FIG. 9, in the bird's eye view images 10F, 10B, 10L, and 10R generated for each of the cameras 1F, 1B, 1L, and 1R, the three bird's eye view images 10F, 10L, and 10R are transformed into the bird's eye view image coordinate of the rear-side camera 1B by the rotation and translation based on the bird's eye view image 10B for the rear-side camera 1B. Therefore, the four bird's eye view images 10F, 10B, 10L, and 10R are synthesized to generate the all-round bird's eye view image. In the all-round bird's eye view image, it is preferable that a boundary line such as a black line be drawn in boundary portions of the bird's eye view images 10F, 10B, 10L, and 10R such that the boundaries of the bird's eye view images 10F, 10B, 10L, and 10R can be recognized.

When the vehicle is stopped, in order to easily see the obstacles in the front and rear views while easily seeing the far-side regions in the front and rear views, the extension bird's eye view images are generated as the bird's eye view images corresponding to the images taken by the front-side camera 1F and rear-side camera 1B, the normal bird's eye view images are generated as the bird's eye view images corresponding to the images taken by the left-side camera 1L and right-side camera 1R, and the all-round bird's eye view image is generated by synthesizing these bird's eye view images.

When the vehicle is driven forward, in order to easily see the obstacles in the front view while easily seeing the far-side regions in the front view, the extension bird's eye view image is generated as the bird's eye view image corresponding to the image taken by the front-side camera 1F, the normal bird's eye view images are generated as the bird's eye view images corresponding to the image taken by the rear-side camera 1B, left-side camera 1L, and right-side camera 1R, and the all-round bird's eye view image is generated by synthesizing these bird's eye view images.

When the vehicle is driven in reverse, in order to easily see the obstacles in the rear view while easily seeing the far-side regions in the rear view, the extension bird's eye view image is generated as the bird's eye view image corresponding to the images taken by the rear-side camera 1B, the normal bird's eye view images are generated as the bird's eye view images corresponding to the images taken by the front-side camera 1F, left-side camera 1L, and right-side camera 1R, and the all-round bird's eye view image is generated by synthesizing these bird's eye view images.

As described above, the extension bird's eye view image is formed by synthesizing the normal bird's eye view image generated for the image within the range in which the distance from the vehicle is not more than the predetermined distance and the pseudo-bird's eye view image generated for the image within the range in which the distance from the vehicle is more than the predetermined distance. Therefore, in order to easily recognize the boundary between the normal bird's eye view image and the pseudo-bird's eye view image in the extension bird's eye view image, it is preferable that the boundary line such as a broken line be drawn in the boundary portion between the normal bird's eye view image and the pseudo-bird's eye view image.

As described in the third embodiment, it is possible to previously determine the coordinate on the extension bird's eye view image corresponding to the coordinate of each pixel of the input image I (image in which the lens strain correction is performed to the image taken by the camera).

For the difference between the extension bird's eye view image and the normal bird's eye view image, θ in the formula (8) (or formula (4)) is changed according to the pixel position in the extension bird's eye view image, while θ is kept constant irrespective of the pixel position in the normal bird's eye view image. Therefore, it is also possible to previously determine the coordinate on the normal bird's eye view image corresponding to the coordinate of each pixel of the input image I (image obtained by lens strain correction).

Further, the coordinate on the bird's eye view image (normal bird's eye view image or extension bird's eye view image) corresponding to each of the cameras 1F, 1B, 1L, and 1R is transformed into the coordinate on the all-round bird's eye view image by the predetermined rotation and the predetermined translation. That is, the post-strain correction input image I of the image taken by each camera is transformed into the bird's eye view image or the extension bird's eye view image, and the obtained bird's eye view image or extension bird's eye view image is transformed into the all-round bird's eye view image. Therefore, all the transformation parameters are fixed values.

Accordingly, it is possible to previously determine the coordinate on the all-round bird's eye view image corresponding to the coordinate of each pixel of the input image I (image obtained by lens strain correction) obtained from each of the cameras 1F, 1B, 1L, and 1R for each of the case where the vehicle is stopped, the case where the vehicle is driven forward, and the case where the vehicle is driven in reverse.

In the fourth embodiment, the coordinate transformation table is previously prepared in each of the cameras 1F, 1B, 1L, and 1R for each of the case where the vehicle is stopped, the case where the vehicle is driven forward, and the case where the vehicle is driven in reverse. The coordinate transformation table transforms the coordinate of each pixel of the input image I (image obtained by lens strain correction) obtained the camera into the coordinate on the all-round bird's eye view image.

Figure 10:
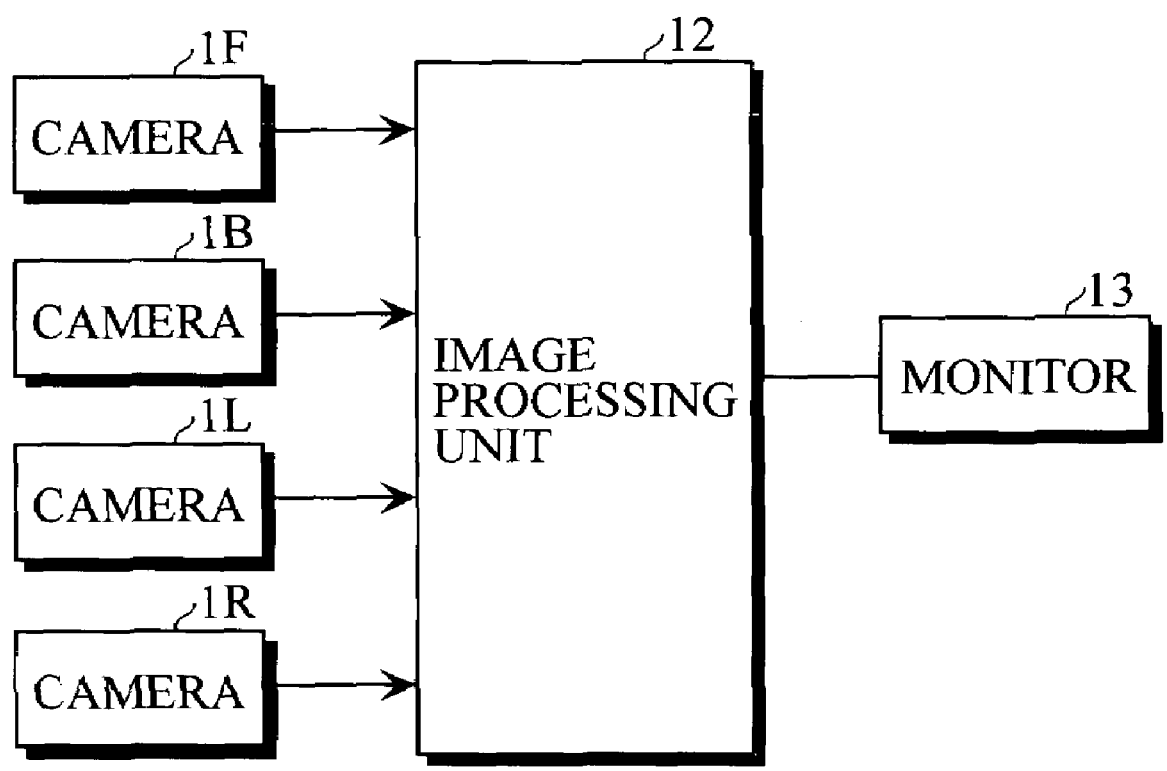
FIG. 10 is a block diagram showing an electric configuration of the driving support system provided in an automobile.

FIG. 10 shows an electric configuration of the driving support system provided in the automobile.

The driving support system includes an image processing unit 12 and a monitor (display device) 13. The image processing unit 12 generates three kinds of the all-round bird's eye view images from the images taken by the cameras 1F, 1B, 1L, and 1R. The monitor 13 arranged in the dashboard inside the vehicle displays the all-round bird's eye view images generated by the image processing unit 12. A signal indicating a gear position is inputted to the image processing unit 12 from a vehicle gear sensor (not shown). The vehicle gear sensor indicates whether the vehicle is stopped or not, and the vehicle gear sensor indicates the driving direction (forward or in reverse).

For example, the CCD camera is used as the cameras 1F, 1B, 1L, and 1R, the microcomputer is used as the image processing unit 12, and the navigation system monitor is used as the monitor 13.

The coordinate transformation tables (coordinate transformation table for stop time, coordinate transformation table for forward travel time, and coordinate transformation table for reverse travel time) are stored for each of the cameras 1F, 1B, 1L, and 1R in a storage unit of the image processing unit 12. The coordinate transformation table for stop time, coordinate transformation table for forward travel time, and coordinate transformation table for reverse travel time transform the coordinate of each pixel of the input image I (image obtained by lens strain correction) obtained from the camera into the coordinate on the all-round bird's eye view image for the case where the vehicle is stopped, the case where the vehicle is driven forward, and the case where the vehicle is driven in reverse respectively.

The coordinate transformation table for stop time, the coordinate transformation table for forward travel time, and the coordinate transformation table for reverse travel time are equal to one another for the camera 1L, so that only one coordinate transformation table can be prepared for the camera 1L. Similarly, the coordinate transformation table for stop time, the coordinate transformation table for forward travel time, and the coordinate transformation table for reverse travel time are equal to one another for the camera 1R, so that only one coordinate transformation table can be prepared for the camera 1R.

The coordinate transformation table for stop time and the coordinate transformation table for forward travel time are equal to each other for the camera 1F, so that a dual-purpose stop time and forward travel time coordinate transformation table and the coordinate transformation table for reverse travel time can be prepared as the coordinate transformation tables for the camera 1F. The coordinate transformation table for stop time and the coordinate transformation table for reverse travel time are equal to each other for the camera 1B, so that a dual-purpose stop time and reverse travel time coordinate transformation table and the coordinate transformation table for forward travel time can be prepared as the coordinate transformation tables for the camera 1B.

Figure 11:
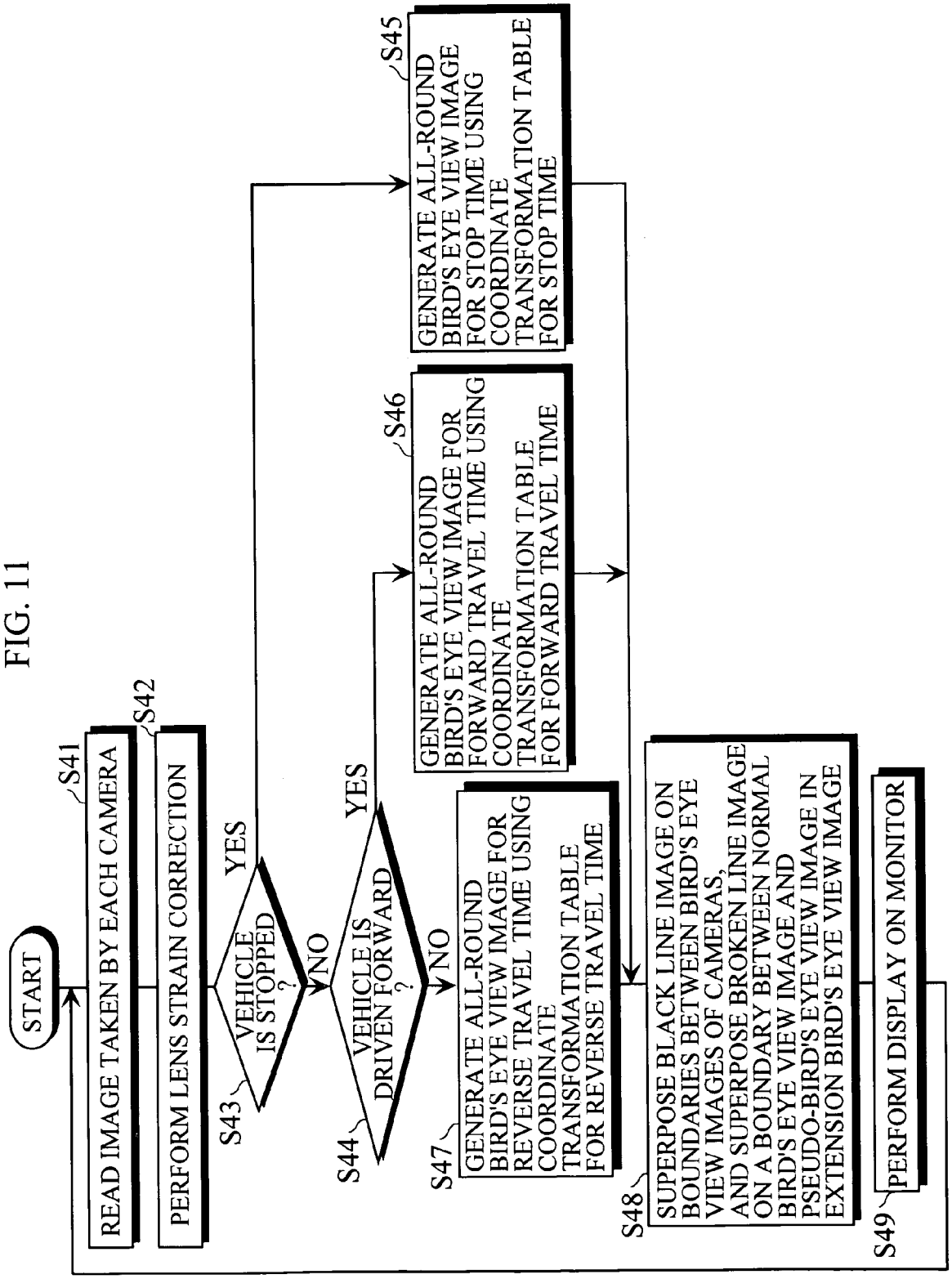
FIG. 11 is a flowchart showing a procedure performed by an image processing unit 12.

FIG. 11 shows a procedure performed by the image processing unit 12.

The images taken by the cameras 1F, 1B, 1L, and 1R are read (Step S41). Then, the lens strain correction is performed to each of the taken images read in Step S41 (Step S42). Hereinafter the image obtained by the lens strain correction is referred to as an input image I.

Whether the vehicle is stopped, driven forward, or driven in reverse is determined based on the signal indicating the gear position from the vehicle gear sensor (Steps S43 and S44). When the vehicle is stopped (YES in Step S43), the all-round bird's eye view image for stop time is generated from the input image I corresponding to each of the cameras 1F, 1B, 1L, and 1R using the coordinate transformation table for stop time corresponding to each of the cameras 1F, 1B, 1L, and 1R (Step S45). In this case, in the all-round bird's eye view image, the bird's eye view images on the front side and rear side of the vehicle become the extension bird's eye view image, and the bird's eye view images on the both sides of the vehicle become the normal bird's eye view image. Then, the flow goes to Step S48.

When the vehicle is driven forward (NO in Step S43 and YES in Step S44), the all-round bird's eye view image for forward travel time is generated from the input image I corresponding to each of the cameras 1F, 1B, 1L, and 1R using the coordinate transformation table for forward travel time corresponding to each of the cameras 1F, 1B, 1L, and 1R (Step S46). In this case, in the all-round bird's eye view image, the bird's eye view image on the front side of the vehicle becomes the extension bird's eye view image, and the bird's eye view images on the rear side and both sides of the vehicle become the normal bird's eye view image. Then, the flow goes to Step S48.

When the vehicle is driven in reverse (NO in Step S43 and NO in Step S44), the all-round bird's eye view image for reverse travel time is generated from the input image I corresponding to each of the cameras 1F, 1B, 1L, and 1R using the coordinate transformation table for reverse travel time corresponding to each of the cameras 1F, 1B, 1L, and 1R (Step S47). In this case, in the all-round bird's eye view image, the bird's eye view image on the rear side of the vehicle becomes the extension bird's eye view image, and the bird's eye view images on the front side and both sides of the vehicle become the normal bird's eye view image. Then, the flow goes to Step S48.

In Step S48, while the black line images are superposed on the boundary portions between the bird's eye view images corresponding to the cameras 1F, 1B, 1L, and 1R in the all-round bird's eye view image, the broken line image is superposed on the boundary between the normal bird's eye view and the pseudo-bird's eye view in the extension bird's eye view image. The obtained image is displayed on the monitor (display device) 13 (Step S49).

Figure 12A:
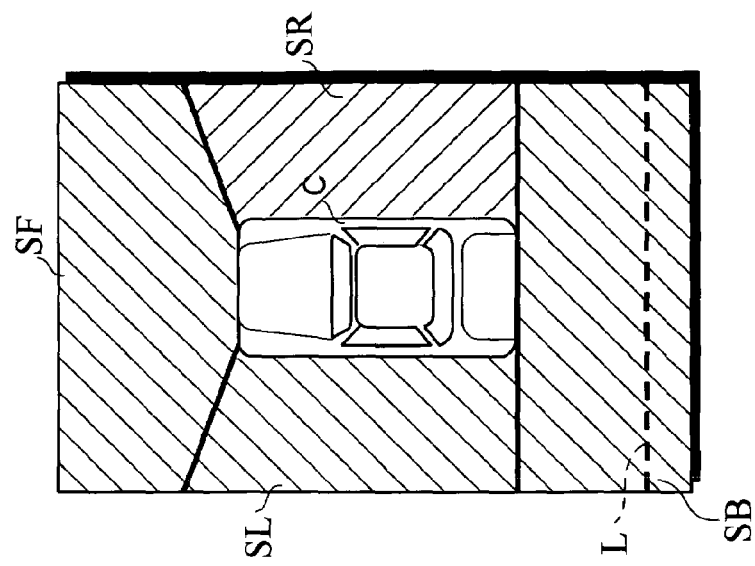
FIGS. 12A to 12C are schematic views showing an all-round bird's eye view image for stop time, an all-round bird's eye view image for forward travel time, and an all-round bird's eye view image for reverse travel time respectively.
Figure 12B:
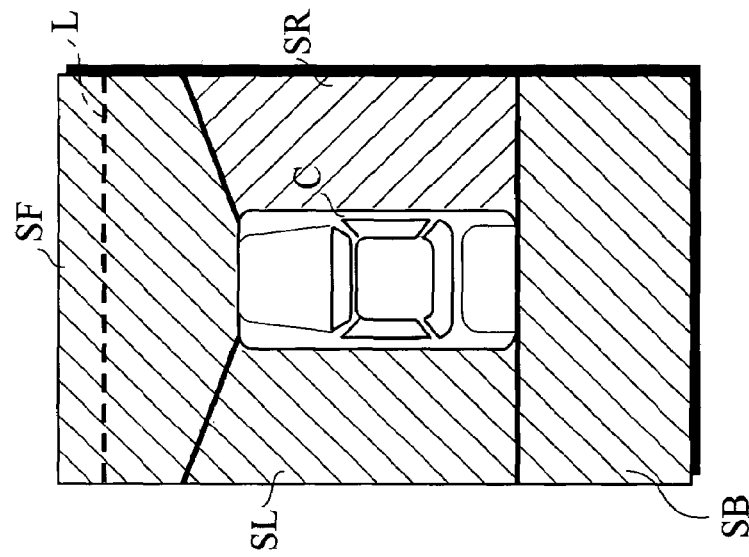
Figure 12C:
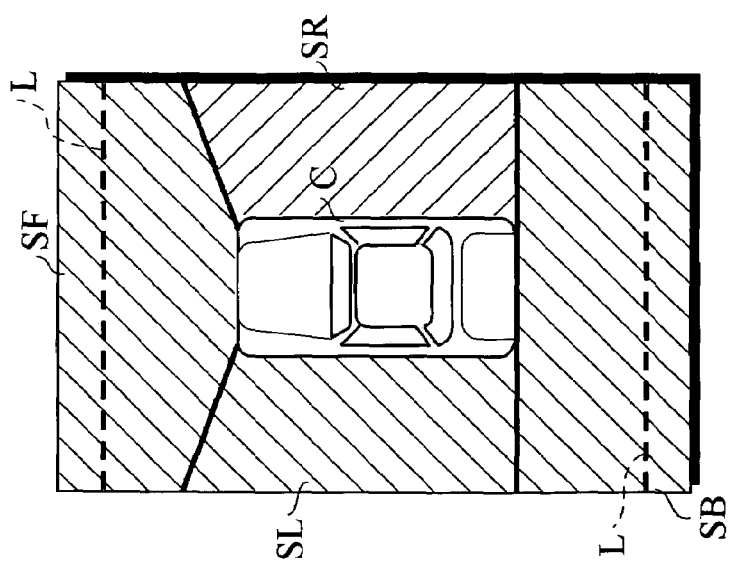

FIGS. 12A to 12C show the all-round bird's eye view image for stop time, the all-round bird's eye view image for forward travel time, and the all-round bird's eye view image for reverse travel time respectively. In FIGS. 12A to 12C, the sign C designates a vehicle, and the signs SF, SB, SL, and SR designate bird's eye view images obtained from the images taken by the cameras 1F, 1B, 1L, and 1R respectively.

In the all-round bird's eye view image for stop time of FIG. 12A, SF and SB become the extension bird's eye view images, and SL and SR become the normal bird's eye view images. A broken line L in SF indicates the boundary between the normal bird's eye view image and the pseudo-bird's eye view image in SF. A broken line L in SB indicates the boundary between the normal bird's eye view image and the pseudo-bird's eye view image in SB.

In the all-round bird's eye view image for forward travel time of FIG. 12B, SF becomes the extension bird's eye view image, and SB, SL, and SR become the normal bird's eye view images. A broken line L in SF indicates the boundary between the normal bird's eye view image and the pseudo-bird's eye view image in SF.

In the all-round bird's eye view image for reverse travel time of FIG. 12C, SB becomes the extension bird's eye view image, and SF, SL, and SR become the normal bird's eye view images. A broken line L in SB indicates the boundary between the normal bird's eye view image and the pseudo-bird's eye view image in SB.

Alternatively, the coordinate transformation table for stop time for performing the strain correction to transform the image (original image) taken by each of the cameras 1F, 1B, 1L, and 1R into the all-round bird's eye view image for stop time, the coordinate transformation table for forward travel time for performing the strain correction to transform the image taken by each of the cameras 1F, 1B, 1L, and 1R into the all-round bird's eye view image for forward travel time, and the coordinate transformation table for reverse travel time for performing the strain correction to transform the image taken by each of the cameras 1F, 1B, 1L, and 1R into the all-round bird's eye view image for reverse travel time are prepared in consideration of the lens strain correction, and the all-round bird's eye view image for stop time, the all-round bird's eye view image for forward travel time, and the all-round bird's eye view image for reverse travel time may be generated from the image taken by each of the cameras 1F, 1B, 1L, and 1R using the coordinate transformation table of each of the cameras 1F, 1B, 1L, and 1R.

What is claimed is:

1. A driving support system which generates a bird's eye view image to display the bird's eye view image on a display device based on an image taken by an image pickup device mounted on a vehicle, the image pickup device taking the image around the vehicle, the driving support system comprising:
a rotation amount setting means for setting a previously-set inclination angle of the image pickup device with respect to a horizontal plane at a rotation angle during coordinate transformation for the image within a range in which a distance from the vehicle is not more than a predetermined threshold in the taken image, the rotation amount setting means which computes and sets the rotation angle during the coordinate transformation based on the previously-set inclination angle of the image pickup device with respect to the horizontal plane and the distance from the vehicle for the image within a range in which the distance from the vehicle is more than the predetermined threshold in the taken image;
a bird's eye view image generating means for generating an extension bird's eye view image by transforming a coordinate of the taken image into a coordinate of a bird's eye view using the rotation angle to the image corresponding to the coordinate, the rotation angle being set by the rotation amount setting means; and
a means for displaying the extension bird's eye view image on the display device, the extension bird's eye view image being obtained by the bird's eye view image generating means.

2. A driving support system according to claim 1, wherein the rotation amount setting means computes the rotation angle during the coordinate transformation such that the rotation angle during the coordinate transformation is decreased as the distance from the vehicle is increased, for the image within the range in which the distance from the vehicle is more than the predetermined threshold in the taken image.

3. A driving support system according to claim 1, wherein the rotation amount setting means includes:
a first means for computing the distance from the vehicle to each portion of the taken image using a transformation for transforming a coordinate of the taken image into a ground coordinate;
a second means for determining and setting the rotation angle during the coordinate transformation in each portion of the taken image based on the previously-set inclination angle of the image pickup device with respect to the horizontal plane, the distance computed by the first means, and the previously set predetermined threshold.

4. A driving support system which generates a bird's eye view image to display the bird's eye view image on a display device based on an image taken by an image pickup device mounted on a vehicle, the image pickup device taking the image around the vehicle, the driving support system comprising:
a coordinate transformation table which transforms a coordinate of the taken image into a coordinate of an extension bird's eye view image according to claim 1;
a bird's eye view image generating means for generating the extension bird's eye view image by transforming the coordinate of the taken image into the coordinate of the extension bird's eye view image using the coordinate transformation table; and
a means for displaying the extension bird's eye view image on the display device, the extension bird's eye view image being obtained by the bird's eye view image generating means.

5. A driving support system which generates a bird's eye view image to display the bird's eye view image on a display device based on an image taken by multiple image pickup devices, the image pickup devices being mounted on at least front and rear portions of a vehicle, the image pickup devices taking the image around the vehicle, the driving support system comprising:

an all-round bird's eye view image generating means for generating plurality of kinds of all-round bird's eye view images from the images taken by the image pickup devices according to a moving direction of the vehicle; and a means for displaying an extension bird's eye view image on the display device, the extension bird's eye view image being obtained by the all-round bird's eye view image generating means, wherein the all-round bird's eye view image is generated by synthesizing the bird's eye view images obtained from the images taken by the image pickup devices, and the all-round bird's eye view image generating means generates an extension bird's eye view image according to claim 1 from the taken image in a direction corresponding to the moving direction of the vehicle, the all-round bird's eye view image generating means generates a normal bird's eye view image from the taken image in another direction, and the all-round bird's eye view image generating means generates the all-round bird's eye view image in which the extension bird's eye view image and the normal bird's eye view image are synthesized.

6. A driving support system which generates a bird's eye view image to display the bird's eye view image on a display device based on an image taken by multiple image pickup devices, the image pickup devices being mounted on at least front, rear, right and left portions of a vehicle, the image pickup devices taking the image around the vehicle, the driving support system comprising:

an all-round bird's eye view image generating means for generating each kind of an all-round bird's eye view image according to a case where the vehicle is driven forward or a case where the vehicle is driven in reverse; and a means for displaying an extension bird's eye view image on the display device, the extension bird's eye view image being obtained by the all-round bird's eye view image generating means, wherein the all-round bird's eye view image is generated by synthesizing the bird's eye view images obtained from the images taken by the image pickup devices, the all-round bird's eye view image generating means generates an extension bird's eye view image according to claim 1 from the image taken by the front-side image pickup device, the all-round bird's eye view image generating means generates normal bird's eye view images from the images taken by the rear-side and both-side image pickup devices, and the all-round bird's eye view image generating means generates a first all-round bird's eye view image in which the extension bird's eye view image and the normal bird's eye view images are synthesized, when the vehicle is driven forward, and the all-round bird's eye view image generating means generates the extension bird's eye view image according to claim 1 from the image taken by the rear-side image pickup device, the all-round bird's eye view image generating means generates the normal bird's eye view images from the images taken by the front-side and both-side image pickup devices, and the all-round bird's eye view image generating means generates a second all-round bird's eye view image in which the extension bird's eye view image and the normal bird's eye view images are synthesized, when the vehicle is driven in reverse.

7. A driving support system according to claim 6, wherein the all-round bird's eye view image generating means includes:

a first coordinate transformation table which transforms a coordinate of the image taken by each image pickup device into a coordinate of the first all-round bird's eye view image;

a second coordinate transformation table which transforms the coordinate of the image taken by each image pickup device into a coordinate of the second all-round bird's eye view image;

a first all-round bird's eye view image generating means for generating the first all-round bird's eye view image by transforming the coordinate of the image taken by each image pickup device into the coordinate of the first all-round bird's eye view image using the first coordinate transformation table, when vehicle is driven forward; and a second all-round bird's eye view image generating means for generating the second all-round bird's eye view image by transforming the coordinate of the image taken by each image pickup device into the coordinate of the second all-round bird's eye view image using the second coordinate transformation table, when vehicle is driven in reverse.

8. A driving support system which generates a bird's eye view image to display the bird's eye view image on a display device based on an image taken by multiple image pickup devices, the image pickup devices being mounted on at least front, rear, right, and left portions of a vehicle, the image pickup devices taking the image around the vehicle, the driving support system comprising:

an all-round bird's eye view image generating means for generating each kind of an all-round bird's eye view image from images taken by each image pickup device according to, a case where the vehicle is stopped, a case where the vehicle is driven forward, or a case where the vehicle is driven in reverse; and a means for displaying an extension bird's eye view image on the display device, the extension bird's eye view image being obtained by the all-round bird's eye view image generating means, wherein the all-round bird's eye view image is generated by synthesizing the bird's eye view images obtained from the images taken by the image pickup devices, the all-round bird's eye view image generating means generates extension bird's eye view images according to claim 1 from the images taken by the front-side and rear-side image pickup devices, the all-round bird's eye view image generating means generates normal bird's eye view images from the images taken by the both-side image pickup devices, and the all-round bird's eye view image generating means generates a first all-round bird's eye view image in which the extension bird's eye view images and the normal bird's eye view images are synthesized, when the vehicle is stopped, the all-round bird's eye view image generating means generates the extension bird's eye view image according to claim 1 from the image taken by the front-side image pickup device, the all-round bird's eye view image generating means generates the normal bird's eye view images from the images taken by the rear-side and both-side image pickup devices, and the all-round bird's eye view image generating means generates a second all-round bird's eye view image in which the extension bird's eye view image and the normal bird's eye view images are synthesized, when the vehicle is driven forward, and the all-round bird's eye view image generating means generates the extension bird's eye view image according to claim 1 from the image taken by the rear-side image pickup device, the all-round bird's eye view image generating means generates the normal bird's eye view images from the images taken by the front-side and both-side image pickup devices, and the all-round bird's eye view image generating means generates a third all-round bird's eye view image in which the extension bird's eye view image and the normal bird's eye view images are synthesized, when the vehicle is driven in reverse.

9. A driving support system according to claim 8, wherein the all-round bird's eye view image generating means includes:

a first coordinate transformation table which transforms a coordinate of the image taken by each image pickup device into a coordinate of the first all-round bird's eye view image;

a second coordinate transformation table which transforms the coordinate of the image taken by each image pickup device into a coordinate of the second all-round bird's eye view image;

a third coordinate transformation table which transforms the coordinate of the image taken by each image pickup device into a coordinate of the third all-round bird's eye view image;

a first all-round bird's eye view image generating means for generating the first all-round bird's eye view image by transforming the coordinate of the image taken by each image pickup device into the coordinate of the first all-round bird's eye view image using the first coordinate transformation table, when vehicle is stopped;

a second all-round bird's eye view image generating means for generating the second all-round bird's eye view image by transforming the coordinate of the image taken by each image pickup device into the coordinate of the second all-round bird's eye view image using the second coordinate transformation table, when vehicle is driven forward; and a third all-round bird's eye view image generating means for generating the third all-round bird's eye view image by transforming the coordinate of the image taken by each image pickup device into the coordinate of the third all-round bird's eye view image using the third coordinate transformation table, when vehicle is driven in reverse.

* * * * *